United States Patent
Seroussi et al.

(10) Patent No.: US 11,899,765 B2
(45) Date of Patent: Feb. 13, 2024

(54) DUAL-FACTOR IDENTIFICATION SYSTEM AND METHOD WITH ADAPTIVE ENROLLMENT

(71) Applicant: DTS, Inc., Calabasas, CA (US)

(72) Inventors: Gadiel Seroussi, Cupertino, CA (US); Michael M. Goodwin, Scotts Valley, CA (US)

(73) Assignee: DTS Inc., Calabasas, CA (US)

( * ) Notice: Subject to any disclaimer, the term of this patent is extended or adjusted under 35 U.S.C. 154(b) by 312 days.

(21) Appl. No.: 17/131,506

(22) Filed: Dec. 22, 2020

(65) Prior Publication Data

US 2021/0192032 A1 Jun. 24, 2021

Related U.S. Application Data

(60) Provisional application No. 62/952,899, filed on Dec. 23, 2019.

(51) Int. Cl.
| | | |
|---|---|---|
| *G06F 21/32* | (2013.01) | |
| *G06N 3/084* | (2023.01) | |
| *G06F 21/40* | (2013.01) | |
| *G06N 3/045* | (2023.01) | |

(52) U.S. Cl.
CPC .............. *G06F 21/32* (2013.01); *G06F 21/40* (2013.01); *G06N 3/045* (2023.01); *G06N 3/084* (2013.01)

(58) Field of Classification Search
CPC ....... G06F 21/32; G06F 21/40; G06N 3/0454; G06N 3/084
USPC .......................................................... 726/17
See application file for complete search history.

(56) References Cited

U.S. PATENT DOCUMENTS

| | | | |
|---|---|---|---|
| 9,396,319 B2 | 7/2016 | Shuart et al. | |
| 9,824,692 B1 | 11/2017 | Khoury et al. | |
| 10,311,342 B1 | 6/2019 | Farhadi et al. | |
| 10,381,009 B2 | 8/2019 | Khoury et al. | |
| 10,902,237 B1* | 1/2021 | Aggarwal | G06K 9/6215 |

(Continued)

FOREIGN PATENT DOCUMENTS

| | | |
|---|---|---|
| CN | 105590625 A | 5/2016 |
| CN | 107330519 A | 11/2017 |

(Continued)

OTHER PUBLICATIONS

Ortega-Garcia, "Authentication Gets Personal with Biometrics", Mar. 2004, IEEE, pp. 50-62 (Year: 2004).*

(Continued)

*Primary Examiner* — Taghi T Arani
*Assistant Examiner* — Gregory A Lane
(74) *Attorney, Agent, or Firm* — Lerner David LLP

(57) ABSTRACT

A multi-factor identification system is provided in which enrolled user authentication information is updated in the course of an authorization request based upon at least one of a confidence level of a match between a request first factor identifier, produced based upon first unique user identifying information received with the authentication request, and a respective matching enrolled first factor identifier and a confidence level of a match between a request second factor identifier, produced based upon second unique user identifying information received with the authentication request, and a respective matching enrolled second factor identifier.

18 Claims, 9 Drawing Sheets

(56) References Cited

U.S. PATENT DOCUMENTS

| | | | |
|---|---|---|---|
| 2007/0219801 A1* | 9/2007 | Sundaram | G10L 17/04 704/270 |
| 2011/0282665 A1* | 11/2011 | Kim | G06V 10/811 382/218 |
| 2013/0063548 A1* | 3/2013 | Rosenberg | H04N 7/142 348/14.09 |
| 2013/0267204 A1 | 10/2013 | Schultz et al. | |
| 2015/0278706 A1* | 10/2015 | Shivashankar | G06N 20/00 706/12 |
| 2015/0302252 A1 | 10/2015 | Herrera | |
| 2015/0347734 A1 | 12/2015 | Beigi | |
| 2016/0006730 A1 | 1/2016 | Chari et al. | |
| 2016/0180068 A1* | 6/2016 | Das | H04L 63/0861 726/7 |
| 2016/0234024 A1* | 8/2016 | Mozer | H04L 9/3231 |
| 2016/0293167 A1 | 10/2016 | Chen et al. | |
| 2016/0359838 A1 | 12/2016 | Dasgupta et al. | |
| 2017/0199996 A1* | 7/2017 | Han | G06K 9/6255 |
| 2018/0018451 A1 | 1/2018 | Spizhevoy et al. | |
| 2018/0082304 A1 | 3/2018 | Summerlin et al. | |
| 2018/0107684 A1 | 4/2018 | Kiapour et al. | |
| 2018/0232508 A1 | 8/2018 | Kursun | |
| 2018/0293429 A1 | 10/2018 | Wechsler et al. | |
| 2018/0307899 A1 | 10/2018 | Das et al. | |
| 2019/0043201 A1 | 2/2019 | Strong et al. | |
| 2019/0072506 A1 | 3/2019 | Mandal et al. | |
| 2019/0095703 A1 | 3/2019 | Das et al. | |
| 2019/0122024 A1* | 4/2019 | Schwartz | G06V 40/1376 |
| 2019/0122373 A1 | 4/2019 | Natroshvili et al. | |
| 2019/0138961 A1 | 5/2019 | Santiago et al. | |
| 2019/0140913 A1 | 5/2019 | Guim Bernat et al. | |
| 2019/0150794 A1 | 5/2019 | Vrudhula et al. | |
| 2019/0213816 A1 | 7/2019 | Grigorov et al. | |
| 2019/0236450 A1 | 8/2019 | Li et al. | |
| 2019/0278895 A1 | 9/2019 | Streit | |
| 2019/0303750 A1 | 10/2019 | Kumar et al. | |
| 2019/0306011 A1 | 10/2019 | Fenoglio et al. | |
| 2019/0311260 A1 | 10/2019 | Baldwin et al. | |
| 2019/0311261 A1 | 10/2019 | Baldwin et al. | |
| 2020/0228336 A1* | 7/2020 | Streit | G06F 7/5443 |
| 2020/0265132 A1* | 8/2020 | Chang | G06K 9/6215 |
| 2021/0043018 A1* | 2/2021 | Zhang | G07C 9/00563 |
| 2021/0192032 A1* | 6/2021 | Seroussi | G06F 21/40 |
| 2022/0138480 A1* | 5/2022 | Jang | G06V 40/50 382/115 |
| 2023/0026942 A1* | 1/2023 | Meral | A61B 8/461 |

FOREIGN PATENT DOCUMENTS

| | | |
|---|---|---|
| CN | 107507286 A | 12/2017 |
| CN | 107808145 A | 3/2018 |
| CN | 108875907 A | 11/2018 |
| CN | 109040091 A | 12/2018 |
| CN | 109844775 A | 6/2019 |
| CN | 109977624 A | 7/2019 |
| CN | 109978145 A | 7/2019 |
| CN | 110019652 A | 7/2019 |
| CN | 110096966 A | 8/2019 |
| EP | 3336735 B1 | 9/2019 |
| JP | 2018085136 A | 5/2018 |
| JP | 6487105 B2 | 3/2019 |
| JP | 2019164793 A | 9/2019 |
| LC | 105224986 A | 1/2016 |
| WO | WO-2017144768 A1 | 8/2017 |
| WO | WO-2017190089 A1 | 11/2017 |
| WO | WO-2017201912 A1 | 11/2017 |
| WO | WO-2018075752 A1 | 4/2018 |
| WO | WO-2019001566 A1 | 1/2019 |
| WO | WO-2019016106 A1 | 1/2019 |
| WO | WO-2019028089 A1 | 2/2019 |
| WO | WO-2019050265 A1 | 3/2019 |
| WO | WO-2019089432 A1 | 5/2019 |
| WO | WO-2019154107 A1 | 8/2019 |
| WO | WO-2019157333 A1 | 8/2019 |
| WO | WO-2019166601 A1 | 9/2019 |
| WO | WO-2019173562 A1 | 9/2019 |
| WO | WO-2019179036 A1 | 9/2019 |
| WO | WO-2019199943 A1 | 10/2019 |
| WO | WO-2019200264 A1 | 10/2019 |

OTHER PUBLICATIONS

Shokri, "Privacy-Preserving Deep Learning", 2015, ACM SIGSAC, pp. 1-12 (Year: 2015).*

Wan, Li, et al., "Generalized End-to-End Loss for Speaker Verification", arXiv:1710.10467v4 [eess.AS], (Jan. 24, 2019), 5 pgs.

* cited by examiner

DUAL-FACTOR IDENTIFICATION SYSTEM AND METHOD WITH ADAPTIVE ENROLLMENT

BACKGROUND

Biometric authentication systems have become increasingly popular in consumer electronic applications. Examples of such systems include face recognition systems, voice identification systems, and fingerprint authentication systems. To improve security, some systems employ multi-factor identification, in which two modalities are used simultaneously for identification. For example, a smart doorbell may have a camera, which can be used for face identification, and a microphone, which can be used for voice identification. A user is required to satisfy both face identification-based authorization criteria and voice identification-based authorization criteria to meet a multi-factor authorization requirement.

Modern biometric identification systems are often based on deep neural networks (DNNs). An example biometric identification system maps biometric identifying data to embeddings within a high-dimensional real-valued space. Given specific biometric identifying data of a person (e.g., a recording of a person's speech utterance, an image of the person's face, or a fingerprint), a neural network maps the measured identifying data to a region of the high-dimensional real-valued space. L. Wan et al., "Generalized end-to-end loss for speaker verification", IEEE, ICAASSP 2018, pages 4879-4883 discloses an example of a DNN trained to compute embeddings based upon biometric identifying data and their use in user authentication. The example biometric identification system requires each authorized user to enroll in an enrollment database that provides an indication of an enrollment embedding region computed for each authorized user based upon the user's biometric identifying data. During enrollment, an authorized user provides biometric identifying data to the biometric identification system, which uses the DNN to compute an enrollment embedding region corresponding to the enrolling user. The system stores indications of the computed enrollment embedding regions in the enrollment database for later use during user authorization. More particularly, as a condition to accessing to a protected domain, for example, a user is required to show that he or she is an authorized user by providing identifying biometric data to the biometric identification system, which uses the DNN to compute an authorization request embedding corresponding to the user requesting access to the protected domain. A requesting user is granted authorization to access to the protected domain only if the authorization request embedding computed for the requesting user matches an enrollment embedding region indicated within the enrollment database corresponding to a previously authorized and enrolled user.

While previous DNN-based biometric identification systems generally are effective, authorization errors can occur due to statistical variations in biometric identifying information provided during authorization enrollment as well as due to variations in biometric identifying information provided between enrollment and authorization requests. FIG. 1 is an illustrative example drawing showing a point cloud of embeddings 102 within a high-dimensional real-valued space 104 that represent biometric identifying data of a user provided during the user's authorization enrollment and that shows a corresponding enrollment embedding region 106 for the user. An example DNN and enrollment system can be configured to use a totality (or at least a very large number) of points within the point cloud to compute the enrollment embedding region. In this example, a dense cluster of embeddings of biometric identifying data fall outside of the oval-shaped enrollment embedding region and a wide scattering of outlier embeddings are located distant from both the enrollment embedding region and the dense cluster of embeddings. Thus, in this illustrative example, a combination of the outlier embeddings and the dense cluster of embeddings has resulted in an enrollment embedding region that does not encompass the dense cluster of embeddings. As a result, when the authorized user for whom the enrollment embedding region is computed later attempts to authenticate, an embedding of the user's later-provided biometric identifying data at the time of authentication, may tend to map nearer the center of the dense cluster of embeddings than to the enrollment embedding region. Therefore, variations in biometric identification data provided during enrollment, as well as variations between data provided during enrollment and authentication, can reduce efficacy of an enrollment embedding region, which can result in an authorized user having a higher likelihood of being rejected. Thus, there is a need to improve authorization enrollment in biometric identification systems.

SUMMARY

In one aspect, a multi-factor identification system includes a storage device that stores authentication information that includes a plurality of respective enrolled user multi-factor identifiers that includes respective enrolled first factor identifiers and respective enrolled second factor identifiers. An authentication manager is configured to a receive an authentication request that includes a first factor user-identifying measurement and a second factor user-identifying measurement. The authentication manager produces a request first factor identifier and a request second factor identifier, based upon the respective received first factor user-identifying measurement and the respective received second factor user-identifying measurement. The authentication manager searches for a match between the request first factor identifier and an enrolled first factor identifier and a match between the request second factor identifier and an enrolled second factor identifier. In response to finding a match between the request first factor identifier and the respective enrolled first factor identifier and a match between the request second factor identifier with the respective enrolled second factor identifier, the authentication manager updates one of the matching first enrolled factor identifier and the matching second enrolled factor identifier, based upon at least one of a confidence level of the match between the request second factor identifier and the matching enrolled second factor identifier and a confidence level of the match between the request first factor identifier and the matching enrolled first factor identifier.

In another aspect, a multi-factor identification method includes storing at a storage device, authentication information that includes a plurality of respective enrolled user dual factor identifiers that includes respective enrolled first factor identifiers and respective enrolled second factor identifiers. A respective authentication request is received that includes respective first factor unique user-identification information and respective second factor unique user-identification information. A respective request first factor identifier is produced based upon the respective received first factor unique user-identification information and a respective request second factor identifier is produced based upon the respective received second factor unique user-identification information. The authentication information is searched for a match between the request first factor identifier and a respective enrolled first factor identifier and a match between the request second factor identifier and a respective enrolled second factor identifier. In response to finding a match between the request first factor identifier and the respective enrolled first factor identifier and a match between the request second factor identifier with the respective enrolled second factor identifier, updating one of the respective matching first enrolled factor identifier and the respective matching second enrolled factor identifier, based upon at least one of a confidence level of the match between the respective request second factor identifier and the respective matching enrolled second factor identifier and a confidence level of the match between the respective request first factor identifier and the respective matching enrolled first factor identifier.

BRIEF DESCRIPTION OF DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A. Technological Improvement

Technologically improved multi-factor identification systems and methods are disclosed that include adaptive authorization enrollment. Multi-factor identification systems have included enrollment databases that store unique authentication identifiers for authorized users. A unique identifier is computed for each of multiple identification factors for each user. Users of a previously proposed identification system enroll by providing unique user-identifying information indicative of user identity. The user-identifying information can include biometric measurements, such as facial images and vocal utterances, for example. The user-identifying information can include non-biometric measurements. A typical example single-factor identification system computes a unique authentication identifier for each authorized user based upon the user's biometric measurements and stores the unique authentication identifiers in the enrollment database. An example dual-factor identification system may compute a unique authentication identifier for each authorized user for each of two biometric measurements, for instance facial images and vocal utterances, and store these two unique authentication identifiers in the enrollment database for each user. Unfortunately, biometric measurements can be imperfect and statistically variable, which means that enrollment-time biometric measurements sometimes may not represent a user with sufficient precision to compute a unique authentication identifier that can reliably authenticate a user, especially under varying authentication conditions. Thus, an enrolled user with an unreliable unique authentication identifier for one or more biometric measurement factors may be erroneously denied authentication. Users of a previously proposed identification system enroll once, which can mean persistent authentication problems for a user with an unreliable unique authentication identifier. In contrast, the disclosed adaptive dual-factor identification system overcomes this technological problem by updating an enrolled user's unique authentication identifier for one or more biometric measurement factors within the authorization enrollment database based upon biometric measurements provided by the user in conjunction with the user's later requests for authorization. Thus, the reliability of the disclosed identification system improves over time, resulting in fewer erroneous authentication denials.

B. Authentication System Architecture

Figure 1:
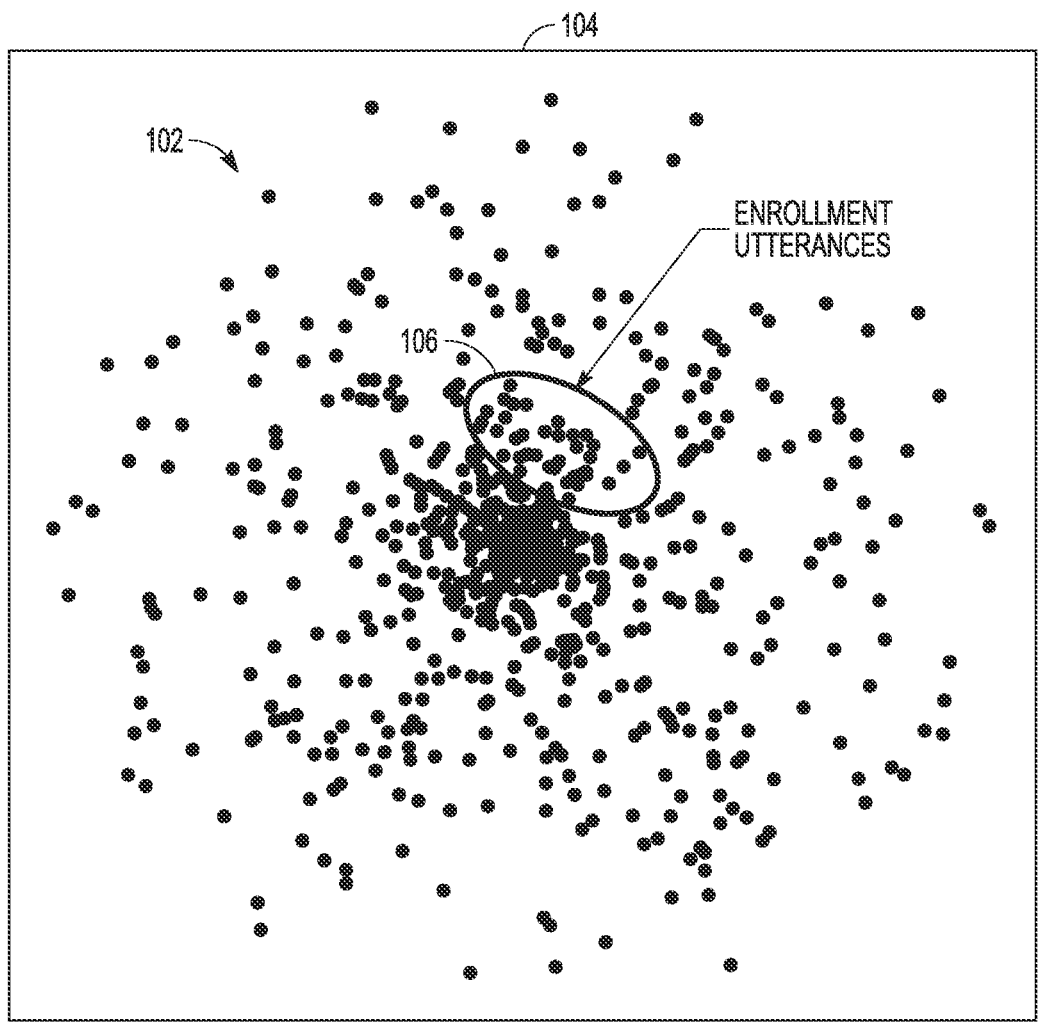
FIG. 1 is an illustrative example drawing showing a point cloud of embeddings and a corresponding enrollment embedding region within a high-dimensional real-valued space.
Figure 2:
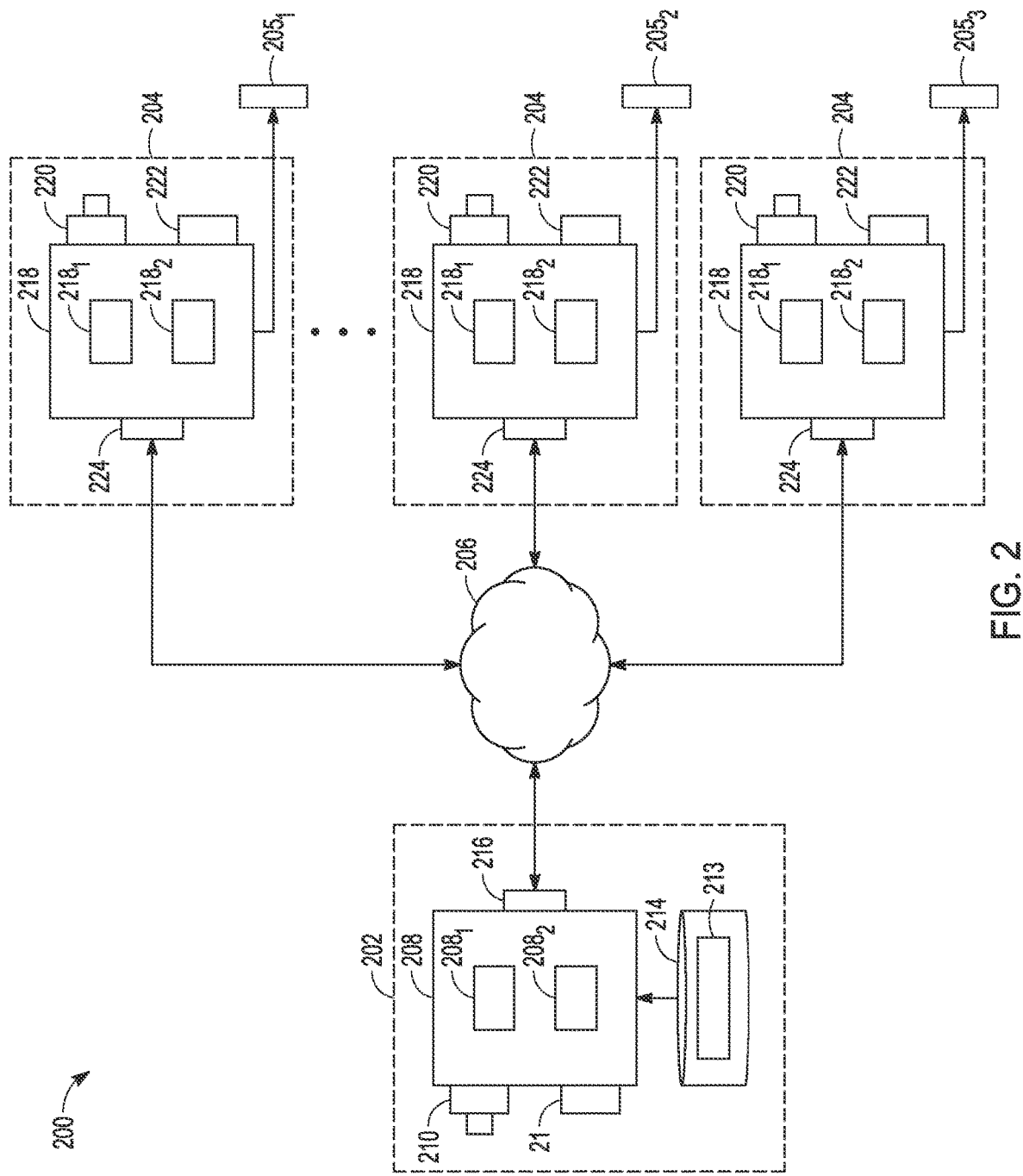
FIG. 2 is an illustrative drawing showing an example biometric authentication system.

FIG. 2 is an illustrative drawing showing an example authentication system 200. The system 200 includes an authentication manager 202 and a plurality of access systems 204 to control access to one or more domains $205_1$-$205_3$. The domains can be a physical domain such as a physical location (e.g., home or office) or can be an abstract domain such as a computer system or a computer network, for example. The authentication manager 202 communicates with the access systems 204 over a communication network 206 that can include the Internet and that can include wired and wireless network connections. The authentication manager 202 includes a computer system 208, which includes at least one processor $208_1$ and a computer readable information storage device $208_2$ operably coupled to the processor $208_1$ and that stores a plurality of instructions that are accessible to, and executable by, the processor. The authentication manager 202 may further includes a camera 210, a microphone 212, a database 213 stored within a persistent storage device 214, and a network interface 216 operable to send and receive information over the network 206. Each access system 204 includes a computer system 218, which includes at least one processor $218_1$ and a computer readable storage device $218_2$ operably coupled to the processor $218_1$ and that stores a plurality of instructions that are accessible to, and executable by, the processor $218_1$. Each access system 204 further includes a camera 220, a microphone 222, and a network interface 224 operable to send and receive information over the network 206.

In an example system, the computer system 208 also can be configured to act as an access device that provides access to a domain (not shown). That is, the camera 210 and microphone 212 associated with the computer 208 at the authentication manager 202 can be used to receive unique user-identifying information for enrollment, and later, can be used to receive unique user-identifying information for authentication. Of course, when the computer system 208 is used for both enrollment and authentication there is no requirement to send unique user-identifying information or authentication results over the network 206 for that user's authentication. The example authentication system 200 and access systems 204 use biometric measurements as unique user-identification information. However, it will be appreciated that an alternative example authentication system and access systems can use non-biometric unique user-identification information in addition to or in place of biometric identifying information. For example, a user can present a unique badge identifier, which is a form of unique user-identification information.

Figure 3:
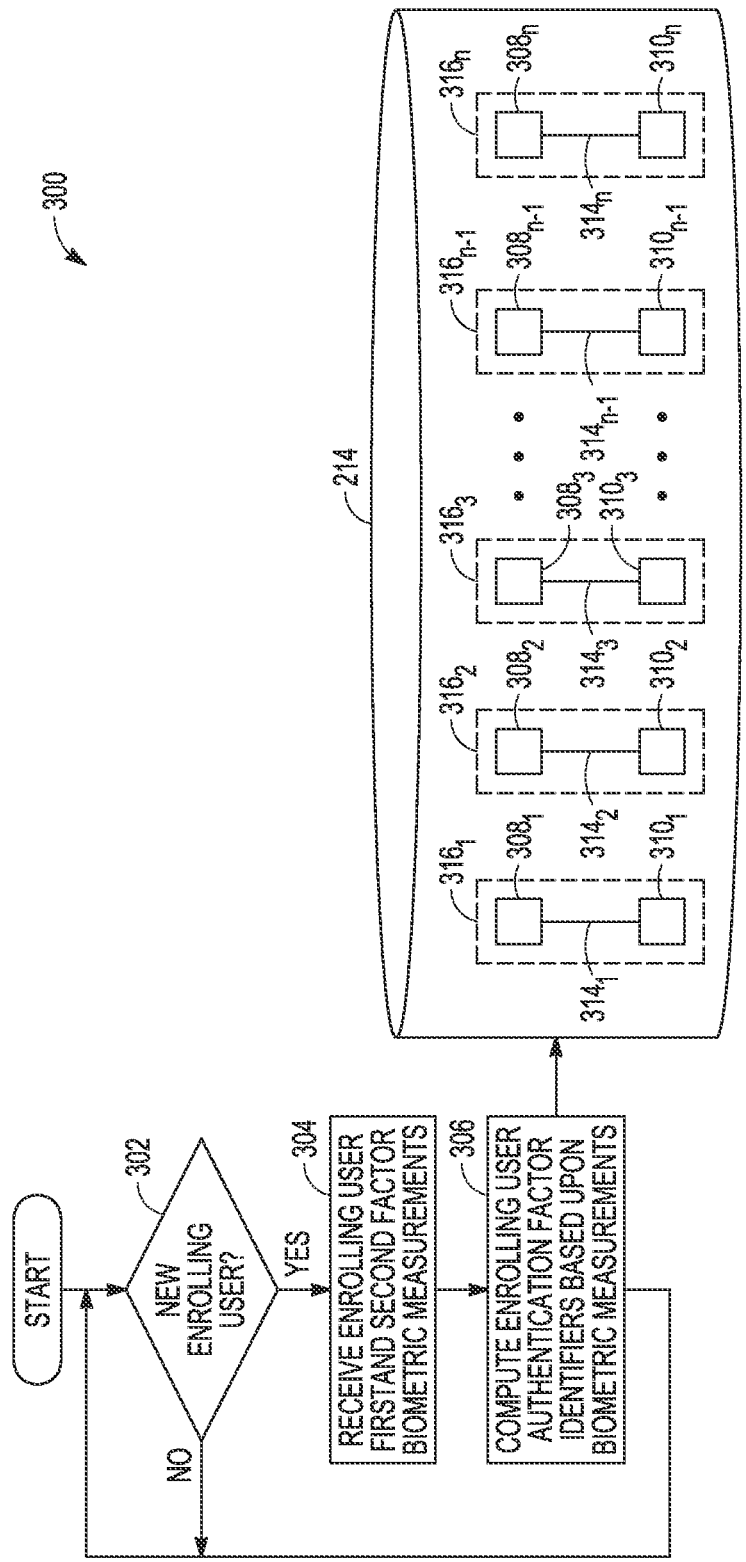
FIG. 3 is an illustrative flow diagram representing an example authorization enrollment process.

FIG. 3 is an illustrative flow diagram representing an example authorization enrollment process 300 performed using the example authentication manager 202. The processor $208_1$ is configured by executable instructions to perform the operations of the process 300. Decision operation 302 waits, as indicated by the "no" branch, for a user to request to enroll as an authorized user. In an example authentication system 200, a user may provide an authorization code to the computer system 208 to indicate that the user possesses authorization to enroll. In other cases within the scope of the current disclosure, a user may have authorization to enroll based on conditions other than an authorization code. A user request to enroll can be received locally through a local user interface (not shown) at the authentication manager 202, such as a mouse device and/or a keyboard and display screen, or can be received by the authentication manager 202 over the network 206 from a remote device (not shown), such as a user computer or mobile device.

In response to a valid authorization code or other indication of authorization to enroll, indicated by the "yes" branch of operation 302, control next flows to operation 304, which receives first and second unique user identifying information. In the example authorization enrollment process 300, the user identifying information includes biometric measurements provided by the enrolling user. In an example biometric authentication system 200, the first factor biometric measurements include facial images and the second factor biometric measurements include voice utterances. In an example authentication manager 202, during operation 304 the computer system 208 causes the camera 210 to capture multiple images of the enrolling user's face, which act as first factor biometric identifying measurements, and causes the microphone 212 to record one or more of the enrolling user's voice utterances, which act as second factor biometric identifying measurements. In an example biometric authentication system 200, an enrolling user may be required to pose for the camera 210 to capture multiple frontal, left profile, and right profile face images, and the enrolling user also may be required to recite for the microphone 212 to record multiple predetermined or freely chosen phrases. Multiple separate captured images can be used as multiple separate first factor biometric measurements and multiple separate recorded vocal utterance can be used as multiple separate second factor biometric measurements. Alternatively, during operation 304 the computer system 208 can cause the authentication manager 202 to receive first and second authentication factor biometric measurements provided by an enrolling user over the network 206. For example, an authorized user can use a camera 220 and a microphone 222 at an access system 204 to capture first and second authentication factor biometric measurements, after which the measurements are sent over the network 206 to the authentication manager 202, for example.

Operation 306 computes a first function that produces first authentication factor identifier $308_1$ based upon an enrolling user's multiple first factor biometric measurements and computes a second function that produces second authentication factor identifier $310_1$ based upon the enrolling user's second factor biometric measurements. Operation 306 stores the first and second authentication factor identifiers $308_1$, $310_1$, as constituents of the database 213 within the storage device 214. Operation 306 produces a corresponding association $314_1$, such as a pointer or other reference within the storage device 214, to associate the first and second authentication factor identifiers $308_1$, $310_1$ as a respective authorized user dual authentication factor identifier $316_1$ that correspond to the enrolling user.

In operation, over time, the example storage device 214 stores a multiplicity of authorized user dual authentication factor identifiers $316_1$-$316_n$ that include corresponding first authentication factor identifier $308_1$-$308_n$, corresponding second authentication factor identifier $310_1$-$310_n$ and corresponding associations $314_1$-$314_n$. Each authorized user dual authentication factor identifier $316_1$-$316_n$ corresponds to an enrolled authorized user. For example, a first associated pair $316_1$ that includes first and second unique identifiers $308_1$, $310_1$ corresponds to a first enrolled user; a second associated pair $316_2$ corresponds to a second enrolled user; and . . . an n-th associated pair $316_n$ corresponds to an n-th enrolled user. Control next flows back to decision operation 302.

Figure 4:
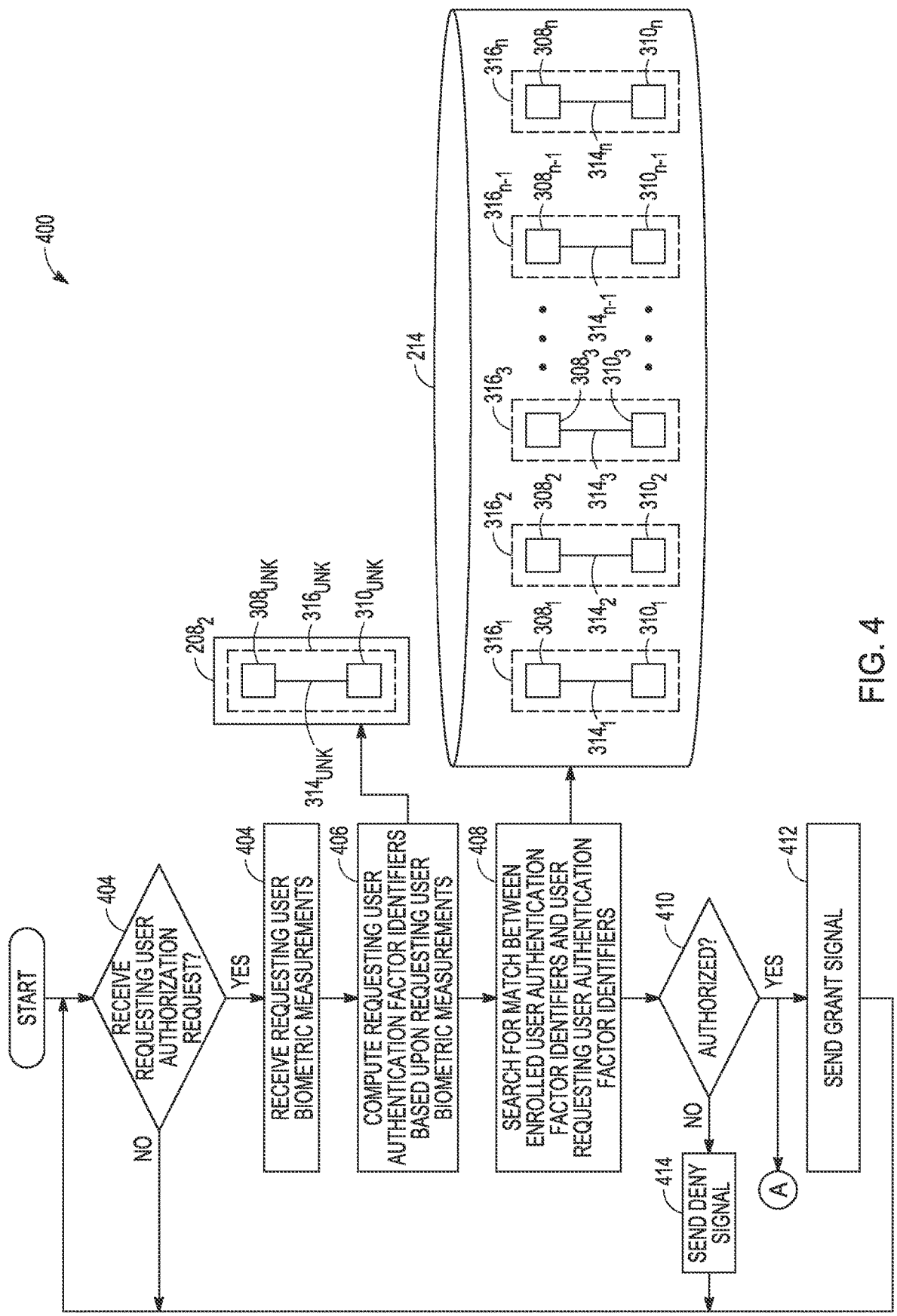
FIG. 4 is an illustrative flow diagram representing an example authorization process at an authentication manager.

FIG. 4 is an illustrative flow diagram representing an example authorization process 400 performed using the example authentication manager 202. The at least one processor $208_1$ is configured by instructions executable by the processor to configure the authentication manager 202 to perform the operations of the authorization process 400. Decision operation 402 waits, indicated by the "no" branch, for an unknown user to request authorization. In an example biometric authentication system 200, an example access system 204 sends an authorization request on behalf of an unknown user, who requests access to a protected domain, over the network 206, for example, to the authentication manager 202. As explained above, some authentication requests may not be sent over a network. In response to receiving an authorization request, indicated by the "yes" branch, control flows to operation 404, which receives first and second factor biometric measurements corresponding to the requesting unknown user. The received first factor biometric measurements can include at least one image of the requesting user's face captured by a camera 220 at an access system 204, for example. The received second factor biometric measurements can include at least one voice utterance recorded by a microphone 222 of the access system 204, for example.

Operation 406 computes a first function that computes first authentication factor identifier based upon the requesting unknown user's first factor biometric measurements and a second function that computes second authentication factor identifier based upon the requesting unknown user's second factor biometric measurements. Operation 406 stores the requesting user's dual authentication factor identifier $316_{unk}$ corresponding to the requesting user, which includes the first and second authentication factor identifiers $308_{unk}$, $310_{unk}$ in the storage device $208_2$, for example.

Operation 408 searches the associated authorized user dual authentication factor identifiers $316_1$-$316_n$ in storage device 214 corresponding to respective previously enrolled authorized users for matches to the requesting user dual authentication factor identifier $316_{unk}$ corresponding to the requesting unknown user. More particularly, operation 408 searches for an enrolled authorized user dual authentication factor identifier (i.e. one of $316_1$-$316_n$) that has first authentication factor identifier (i.e. a corresponding one of $308_1$-$308_n$) that matches the requesting user's first authentication factor identifier $308_{unk}$ and that includes second authentication factor identifier (i.e. a corresponding one of $310_1$-$310_n$) that matches the requesting user's second authentication factor identifier $310_{unk}$. In an example system 200, the first and second authentication factor identifiers include numerical information, and the search for matches includes numerical comparison between one or more of the first authentication factor identifier (i.e. a corresponding one of $308_1$-$308_n$) and requesting user's first authentication factor identifier $310_{unk}$ and includes numerical comparison between one or more of the second authentication factor identifier (i.e. a corresponding one of $310_1$-$310_n$) and the requesting user's second authentication factor identifier $310_{unk}$.

Decision operation 410 determines whether there exists a match for the requesting user dual authentication factor identifier $316_{unk}$ indicating that the requesting user in fact is an authorized enrolled user. A match exists if there is a match between both the respective first and the second authentication factor identifier $308_{unk}$ and $310_{unk}$ components of the requesting user's dual authentication factor identifier $316_{unk}$ and respectively the first and the second authentication factor identifier components of one of the enrolled authorized user dual authentication factor identifier s $316_1$-$316_n$. A match indicates that the requesting user matches a previously authorized user, and therefore, is an authorized user. No match exists if none of the authorized user dual authentication factor identifiers $316_1$-$316_n$ of the enrolled authorized users includes respective first and second authentication factor identifier components that match both of the respective first and second authentication factor identifiers $308_{unk}$ and $310_{unk}$ components of the requesting user dual authentication factor identifier $316_{unk}$. A "no match" determination indicates that the requesting user does not match a previously authorized user, and therefore, is not an authorized user.

In response to a determination that the requesting unknown user is an authorized user, operation 412 sends a first signal over the network 206 to a requesting access system 204 that includes information indicating that the requesting user is an authorized user. In response to a determination that the unknown user is not an authorized user, operation 414 sends a second signal over the network 206 to the requesting access system 204 that includes information indicating that the unknown user is not an authorized user. Control flows back to decision operation 402 after whichever one of operation 412 or 414 occurred.

Figure 5:
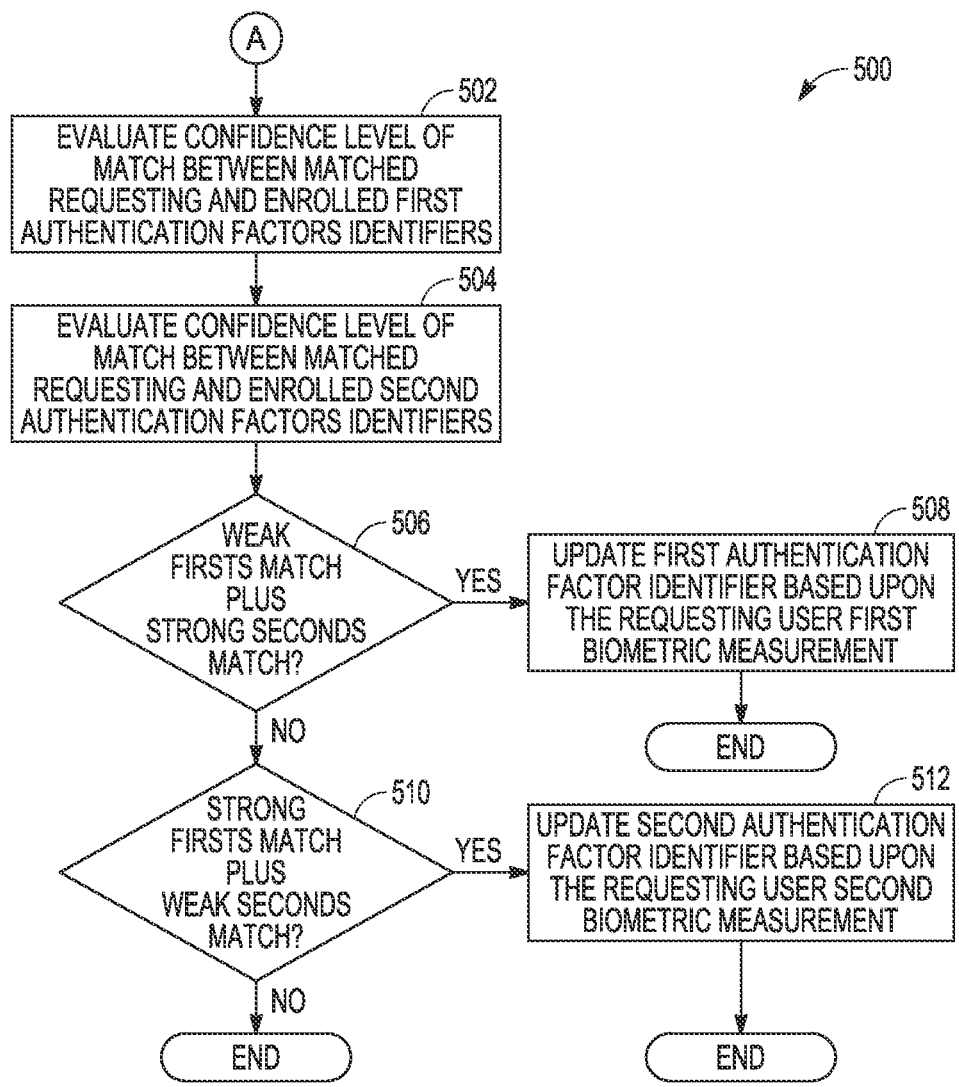
FIG. 5 is an illustrative flow diagram representing an example authorization enrollment update process.

FIG. 5 is an illustrative flow diagram representing an example authorization enrollment update process 500 performed using the example authentication manager 202. The at least one processor $208_1$ is configured by instructions executable by the processor to configure the authentication manager 202 to perform the operations of the process 500. Authorization update process 500 conditionally branches from authorization process 400. In response to a determination at operation 410 of the authorization process 400 that a requesting unknown user is an authorized user, operation 502 of the authorization update process 500 determines a confidence level of the match between the first authentication factor identifier $308_{unk}$ of the requesting user dual authentication factor identifier $316_{unk}$ and a respective first authentication factor identifier component of the matching one of the enrolled authenticated user dual authentication factor identifiers. Operation 504 also determines a confidence level of the match between the second authentication factor identifier $310_{unk}$ of the requesting user dual authentication factor identifier $316_{unk}$ and a respective second authentication factor identifier component of the matching one of the enrolled authorized user dual authentication factor identifiers.

In an alternative example update enrollment process can use a unique badge identifier as first unique user-identification information that corresponds to an enrolled first authentication factor identifier and can use a biometric measurement as second unique user-identification information corresponding to an enrolled second authentication factor identifier, for example. If, for example, an enrolled first authentication factor identifier corresponding to a unique badge identifier results in a high confidence match and second enrolled second authentication factor identifier corresponding to the biometric measurement results in a low confidence match, then the enrolled second authentication factor identifier can be updated. Thus, in this alternative example, a high confidence match corresponding to non-biometric first unique user-identification information is used as a basis to update an enrolled second authentication factor identifier that corresponds to a biometric measurement.

If, for example, the unknown user authentication identifier pair $316_{unk}$ is determined to match the third enrolled authorized authentication identifier pair $316_3$, then operation 502 determines a confidence level of the match between the third enrolled authorized user's first authentication factor identifier $308_3$ and the unknown user's first authentication factor identifier $308_{unk}$. Operation 504 subsequently determines a confidence level of the match between the enrolled authorized user's second authentication factor identifier $310_3$ and the unknown user's second authentication factor identifier $310_{unk}$.

Decision operation 506 determines whether the evaluation in operation 502 indicates a weak match between the first authentication factor identifier $308_{unk}$ of the requesting user dual authentication factor identifier $316_{unk}$ and a respective first authentication factor identifier component of the matching one of the enrolled authorized user dual authentication factor identifiers and the evaluation in operation 504 indicates a strong match between the second authentication factor identifier $310_{unk}$ of the requesting user dual authentication factor identifier $316_{unk}$ and a respective second authentication factor identifier component of the matching one of the enrolled authorized user dual authentication factor identifiers. In response to occurrence of such a combination ("yes" branch), operation 508 updates the matching enrolled authorized user's first authentication factor identifier based upon the requesting user first factor biometric measurements received at operation 404 of the authorization process 400. For example, continuing with the above example, if a match between the requesting user's first authentication factor identifier $308_{unk}$ and the third enrolled authorized user's first authentication factor identifier $308_3$ is weak and a match between the requesting user's second authentication factor identifier $310_{unk}$ and the third enrolled authorized user's second authentication factor identifier $310_3$ is strong, then operation 508 updates the third enrolled authorized user's first authentication factor identifier $308_3$ based upon the requesting user's first factor biometric measurements received at operation 404 of the authorization process 400. If decision operation 506 does not make the aforesaid weak/strong match determination ("No" branch), then control flows to decision operation 510.

Decision operation 510 determines whether the evaluation in operation 502 indicates a strong match between the first authentication factor identifier $308_{unk}$ of the requesting user dual authentication factor identifier $316_{unk}$ and a respective first authentication factor identifier component of the matching one of the enrolled authorized user dual authentication factor identifiers and the evaluation in operation 504 indicates a weak match between the second authentication factor identifier $310_{unk}$ of the requesting user dual authentication factor identifier $316_{unk}$ and a respective second authentication factor identifier component of the matching one of the enrolled authorized user dual authentication factor identifiers. In response to occurrence of such combination ("yes" branch), operation 512 updates the matching enrolled authorized user's second authentication factor identifier based upon the requesting user's second factor biometric measurements received at operation 404 of the authorization process 400. For example, continuing with the above example, if a match between the requesting user's first authentication factor identifier $308_{unk}$ and the third enrolled authorized user's first authentication factor identifier $308_3$ is strong and a match between the requesting user's second authentication factor identifier $310_{unk}$ is weak and the enrolled authorized user's second authentication factor identifier $310_3$ is weak, then operation 512 updates the third enrolled authorized user's second authentication factor identifier $310_3$ based upon the requesting user second factor biometric measurements received at operation 404 of the authorization evaluation process 400. Following operation 508, 512 or the "no" branch of decision operation 510, the process 500 ends.

Figure 6:
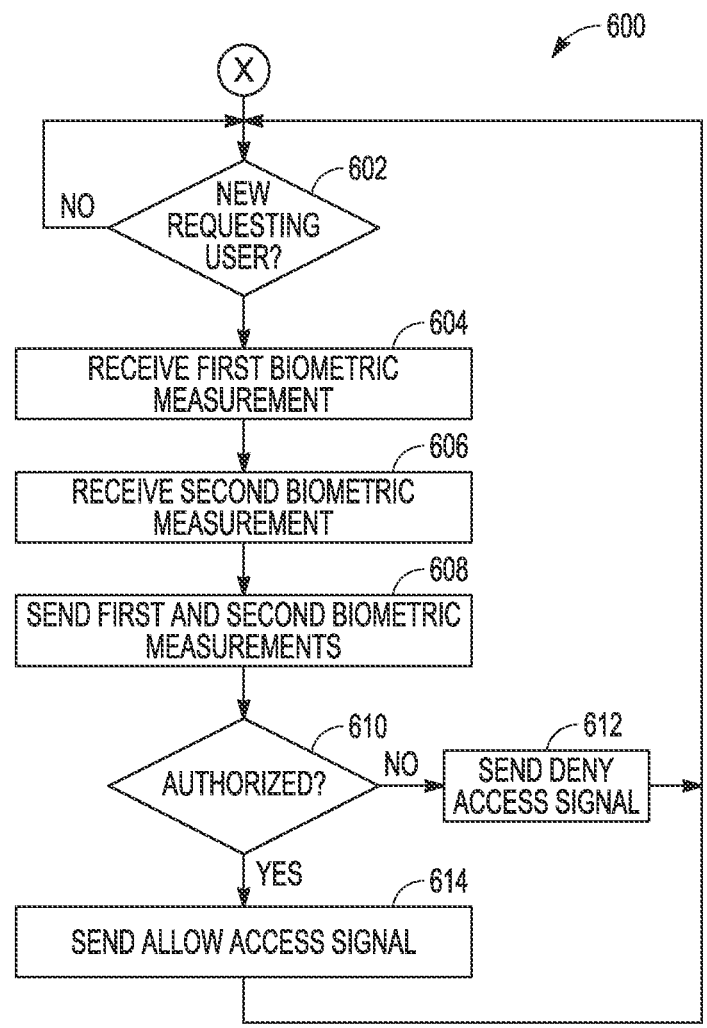
FIG. 6 is an illustrative flow diagram representing an example authorization request process at an access device.

FIG. 6 is an illustrative flow diagram representing an example authorization request process 600 performed using an example access system 204. An at least one processor $218_1$ is configured by instructions executable by the processor to configure the access system 204 to perform the operations of the process 600. Decision operation 602 waits, as indicated by the "no" branch, for a user to request to authorization. In an example access system 204, a user request for authorization can be received through a user interface (not shown) at the access system 204, such as a touch screen, a mouse device and/or keyboard and display screen for example. The access system 204 may include a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network budge, or any machine capable of executing the instructions, for example. An example access system 204 can include a smartphone configured with software to perform the operations of the process 600.

In response to a new request for user authorization, indicated by the "yes" branch of operation 602, control next flows to operation 604, in which the processor $218_1$ causes the camera 220 to capture facial images for a requesting user. In an example access system 204, a requesting user may be required to pose for the camera 220 to capture one or more frontal, left profile, and right profile face images, which comprise first identifying measurements for the requesting user. In an alternative example system, no particular poses are required. The processor $218_1$ detects a face in the field of view of camera 220 and captures one or more facial images as first identifying measurements. Operation 606 includes the processor $218_1$ causing the microphone 222 to record vocal utterances. In an example access system 204, a requesting user may be required to provide one or more separate recorded vocal utterances, which comprise second identifying measurements for the requesting user. Operation 608 sends the first and second identifying measurements over the network 206 to the authentication manager 202. Decision operation 610 receives a communication over the network from the authentication manager 202 indicating whether the requesting user is an authorized user. In response to a communication indicating that a requesting user is not authorized, operation 612 sends a first signal indicating that the requesting user is not authorized. In an example access system 204 that includes a smartphone configured with software to perform the operations of the process 600, the first signal can cause the smartphone to present a message to the user indicating denial of access, for example. In response to a communication indicating that the requesting user is authorized, operation 614 sends a second signal indicating that the requesting user is authorized. In an example access system 204 that include a smartphone configured with software to perform the operations of the process 600, the second signal can cause the smartphone to transmit a wireless signal to an access domain 205 indicating that the requesting user is authorized. The access domain, in turn, provides the requested access, such as by unlocking a physical domain or an abstract domain (e.g., a computer system or network). Control next returns to operation 602.

C. DNNs for Computing Embeddings in a High-Dimensional Real-Valued Space

C.1. Two DNNs for Two Authentication Modalities

Figure 7:
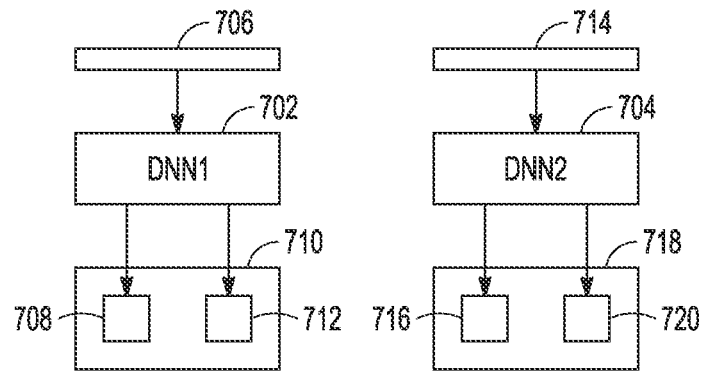
FIG. 7 is an illustrative drawing representing first and second DNNs.

FIG. 7 is an illustrative drawing representing example first and second Deep Neural Networks (DNNs). To enhance security, example biometric authentication system 200 includes uses dual factor identification, in which two modalities of identification/authentication are used simultaneously. The at least one processor $208_1$ of the biometric authentication system 200, is configured with instructions to implement a first DNN 702 and second DNN 704 to compute embedding vectors (referred to as "embeddings") corresponding to respective first and second factor biometric measurements. During operation 306 of the authorization enrollment process 300, for example, the first and second DNNs 702, 704 are used to determine the first authentication factor identifier $308_1$-$308_n$ and the second authentication factor identifier $310_1$-$310_n$.

More particularly, each DNN 702, 704 processes measurements of a different feature. During an example authorization enrollment, the first DNN 702 processes a first enrolling user's face images and the second DNN 704 processes the first enrolling user's vocal features. Given first factor biometric measurements 706 representing the first enrolling user's face image feature, the first DNN 702 computes a first function that maps the face image feature measurements to first embedding vectors 708 in a first high-dimensional real-valued space 710, e.g., a 256-dimensional first vector space. The first DNN 702 computes a first centroid 712 within the first space 710, which is a normalized average of the first embedding vectors computed for the first enrolling user. The first centroid 712 represents a first unique identifier $308_1$ corresponding to the first enrolling user. Given second factor biometric measurements 714 representing first enrolling user's vocal utterance feature, the second DNN 704 computes a second function that maps the vocal utterance feature measurements to second embedding vectors 716 in a second high-dimensional real-valued space 718, e.g., a 256-dimensional second vector space. The second DNN 704 computes a second centroid 720 within the second space 718, which is a normalized average of the second embedding vectors computed for the first enrolling user. The second centroid 720 represents a second unique identifier 310₁ corresponding to the first enrolling user.

C.2. Details of DNN Embeddings

For efficiency of disclosure, the following paragraphs of this section refer to the operation of a single DNN and a single authentication factor identifier, but it will be appreciated that the explanation applies to both the first and second DNNs 702, 704.

If $V$ is the space of all possible measurements of the feature e.g., all possible images of a person's face, with a predetermined size and resolution, or all possible speech utterances of a given time length), then the neural network computes a function $$f: V \to \mathbb{R}^N$$

where $\mathbb{R}^N$ is the N-dimensional real space (referred to as an "embedding space" or "space"). If $v$ is a measured feature, the vector $f(v)$ is referred to as the embedding of $v$ in $\mathbb{R}^N$.

Formally stated, an example neural network is trained to produce a mapping with the following fundamental clustering properties:

(a) if $v_1$ and $v_2$ are measured features from the same individual, then, with high probability, $$\|f(v_1) - f(v_2)\| < \epsilon,$$

and (b) if $v_1$ and $v_2$ are measured features from different individuals, then, with high probability, $$\|f(v_1) - f(v_2)\| \geq \epsilon,$$

where $\|x\|$ is some norm of x (say, for simplicity, the $L_2$, or Euclidean norm), and $\epsilon$ is a constant controlling the error characteristics of the DNN. In other words, if $v_1$ and $v_2$ are features from the same individual, their embeddings will tend to be clustered close to each other in the embedding space, while if they are from different individuals, they will tend to be far apart in that space.

An example of the training of a DNN for the computation of a DNN is provided in Li Wan et al., "Generalized end-to-end loss for speaker verification", IEEE, ICAASSP 2018, pages 4879-4883, which is expressly incorporated herein in its entirety.

C.3. Details of Use of DNN for Authorization Enrollment

For efficiency of disclosure, the following paragraphs of this section refer to the operation of a single DNN, but it will be appreciated that the explanation applies to both the first and second. DNNs 702, 704.

During the authorization enrollment process 300, an example DNN computes embeddings from user biometric measurements. The DNN is configured to compute embeddings such that it is likely that multiple embeddings corresponding to the same individual are near each other in the embedding space and such that it is likely that embeddings corresponding to different individuals are far from each other in the embedding space. The distance between two embeddings in the embedding space may be determined as a vector distance or as a vector norm of the difference between the two embeddings.

During the authorization enrollment process 300, a centroid is computed for the embeddings corresponding to each individual. The centroid acts as a (first or second) authentication factor identifier described with reference to operation 306. It is noted that the DNN computes the embeddings but the centroid computation occurs outside the DNN. An example centroid computed for an individual is the normalized average of the embedding vectors computed for the individual. Since the embeddings computed by the DNN for different individuals tend to be distant from each other in the embedding space, the centroids computed for different individuals likewise tend to be distant from each other in the embedding space.

Figure 8:
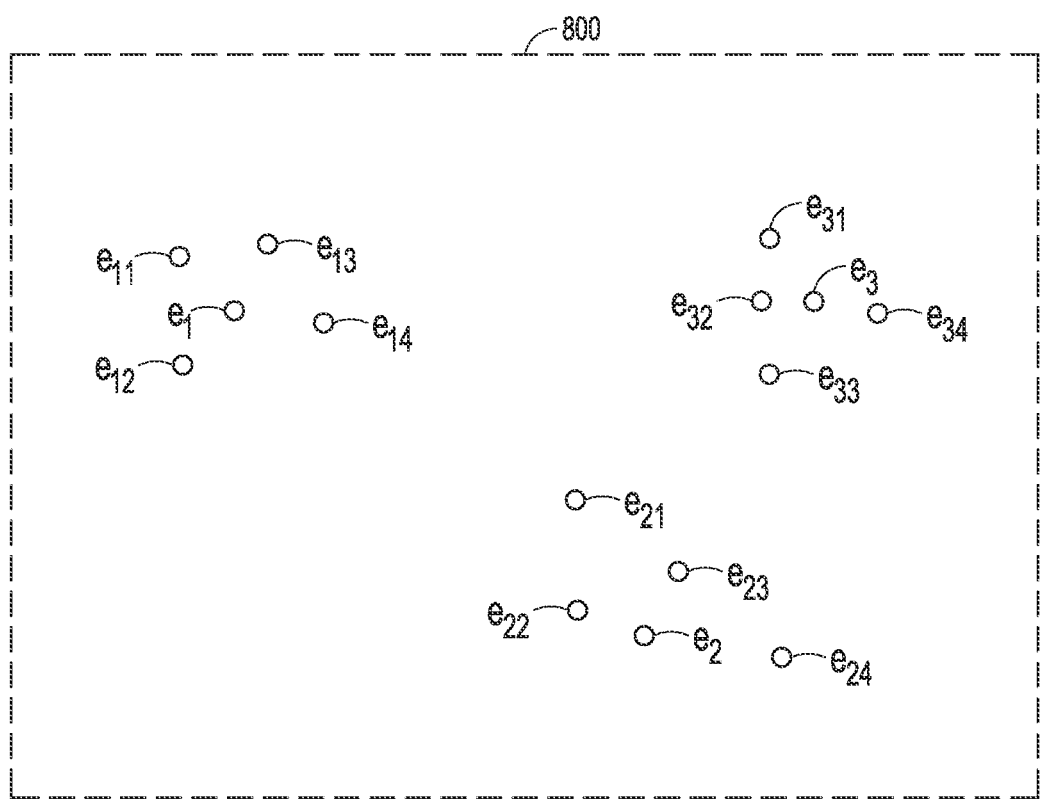
FIG. 8 is an illustrative drawing representing example embeddings and centroids within an embedding space for three different example users.

FIG. 8 is an illustrative drawing representing example embeddings and centroids within an embedding space 800 for three different example users. Embeddings $e_{11}$, $e_{12}$, $e_{13}$, and $e_{14}$ and corresponding centroid $c_1$ correspond to a first authorized user. Embeddings $e_{21}$, $e_{22}$, $e_{23}$, and $e_{24}$ and corresponding centroid $c_2$ correspond to a second authorized user. Embeddings $e_{31}$, $e_{32}$, $e_{33}$, and $e_{34}$ and corresponding centroid $c_3$ correspond to a third authorized user.

Formally stated, during the enrollment process 300, for each enrolled user u a set of measurements $v_{u,1}$, $v_{u,2}$, ..., $v_{u,m}$ are taken of the feature of interest, and the DNN computes corresponding embeddings $f(v_{u,1})$, $f(v_{u,2})$, ..., $f(v_{u,m})$. By property (a) above, the embeddings will tend to cluster in N-dimensional space, and they will tend to be close to the centroid of the set of embeddings $\{f(v_{u,1}), f(v_{u,2}), \ldots, f(v_{u,m})\}$. In the sequel, we assume that embeddings are normalized (i.e. each has norm $\|f(v_{u,m})\| = 1$. In that case, the centroid is just the normalized average of the vectors, i.e., $$c_u = \frac{f(v_{u,1}) + f(v_{u,2}) + \cdots + f(v_{u,m})}{\|f(v_{u,1}) + f(v_{u,2}) + \cdots + f(v_{u,m})\|}.$$

The set of embeddings $\{f(v_{u,1}), f(v_{u,2}), \ldots f(v_{u,m})\}$ are referred to as an enrollment cluster.

Assume, for example, the total enrollment of an instance of the biometric authentication system 200 consists of n authorized users $u_1, u_2, \ldots, u_n$. During the enrollment process 300, the centroids $c_{u1}, c_{u2}, \ldots, c_{un}$ are computed and stored, and the system 200 is ready for authentication attempts.

C.4. Use of DNN for Authorization Requests

For efficiency of disclosure, the following paragraphs of this section refer to the operation of a single DNN, but it will be appreciated that the explanation applies to both the first and second DNNs.

During operation 406 of the authentication process 400, when a requesting person p requests to be authenticated, $\ell$ biometric identifying feature measurements $w_{p,1}$, $w_{p,2}$, ... $w_{p,\ell}$ are taken, their embeddings are computed, and so is their centroid $\hat{c}_p$. The number $\ell$ is generally smaller than the number in used in enrollment (with $\ell = 1$ being a feasible choice). In cases where $\ell = 1$, the centroid $\hat{c}_p$ is equivalent to the single measurement embedding $w_{p,1}$.

During operation 408 of the authentication process 400, to authenticate requesting user p, the authentication manager compares the centroid $\hat{c}_p$ to each of the enrollment centroids $c_1, c_2, \ldots, c_m$. Let enrolled user t be such that the distance $d_{p,t} = \|\hat{c}_p - c_t\|$ is minimized. If $d_{p,t} \leq \tau$ for a predetermined threshold distance $\tau$, the authentication manager determines that user p is authenticated and identifies requesting user p with enrolled user t. Moreover, the authentication manager is usually able to provide a numerical level of confidence $\gamma$ in its identification of p; for instance, in the case described above, a confidence level can be derived based on the value of the distance metric used for authentication. In other cases, a confidence level may be determined based on other classification metrics. In other cases, a confidence level may be determined based on authentication error rates. For example, for unit-norm embeddings we can use $\gamma=\frac{1}{2}(2-d_{p,t})$ for this purpose (other options are also available) such that a value of $\gamma$ close to 1 corresponds to a distance $d_{p,t}$ near 0 and a value of $\gamma$ close to 0 corresponds to a distance $d_{p,t}$ near 2 (which is the maximum distance between unit-norm vectors); higher values of $\gamma$ mean higher confidence (a closer match), and $\gamma=1$ means highest confidence (a perfect match). The threshold vector distance $\tau$ may be selected based upon, but not necessarily equal to the parameter $\epsilon$ mentioned in (a) and (b) above. If none of the enrolled centroids is within the threshold distance $\tau$, the process 400 determines that the requesting user p is not an authorized user. The centroid $c_i$ and the threshold distance $\tau$ about the centroid $c_i$ defines an enrollment embedding region within an embedding space for the centroid $c_i$. The requesting user's centroid $\hat{c}_p$ matches centroid $c_i$ if the vector distance between them is less than $\tau$. In some cases, a confidence level can be determined based on a mapping of a classification metric such as distance onto an appropriate confidence scale such as 0 to 1. In some cases, the mapping from a classification metric to a confidence level may be based on authentication error. For example, in some cases, the confidence level associated with a particular value of a classification metric may be determined at least in part by the rate of false positives observed for a test set (unenrolled users who are authenticated) when that metric level is used as an authentication threshold. In some cases, the confidence level associated with a particular value of a classification metric may be determined at least in part by the rate of false negatives observed for a test set (enrolled users who are not authenticated) when that metric level is used as an authentication threshold.

In an example biometric authentication system 200, during operation 408 of the example authentication process 400, each respective first authentication factor identifier $308_1$-$308_n$ is a respective centroid of embeddings of different respective authorized users for a first biometric identification factor, and each respective second authentication factor identifier $310_1$-$310_n$ is a respective centroid of embeddings of the different respective authorized users for a second biometric identification factor. Moreover, during operation 406 of the example authentication process 400, a requesting user's first authentication factor identifier $308_{unk}$ is a centroid of embeddings corresponding to the requesting user's first biometric identifying information, and second authentication factor identifier $310_{unk}$ is a centroid of embeddings corresponding to the requesting user's second biometric identifying information. The authentication manager at operation 408 processes the respective first authentication factor identifier $308_1$-$310_n$ and $308_{unk}$ to identify first authentication mode matches. The authentication manager at operation 408 processes the respective second authentication factor identifier $310_1$-$310_n$ and $310_{unk}$ to identify second authentication mode matches.

C.5. Use of Two DNNs for Adaptive Authorization Enrollment

The adaptive enrollment process 500 address the issue of "bad enrollments" by using first and second biometric identifying information acquired during the authentication process 400 to improve the quality of first and second enrollment identifiers. One challenge with adaptive enrollment during authentication attempts is the lack of a "ground truth" at the outset of the attempt. During an initial authorization enrollment during process 300, for example, it assumed that the person enrolling is legitimate (i.e., it is assumed that the enrollee obtained access to the enrollment process by legitimate means). Therefore, the ground truth is available during the initial enrollment. Later, however, during adaptive enrollment in the course of an authentication request, "ground truth" is not available. In other words, at the outset of an authorization request, we do not know who the requesting user is, and that is precisely what we need to determine.

To address this "ground truth" problem in the disclosed dual factor biometric authentication system 200, the adaptive authorization enrollment process 500 uses an outcome of the authorization process 400, for one of the first and second biometric identifying information, as "ground truth" for the other of the first and second biometric identifying information.

Operation 408 of authorization process 400 determines whether a requesting user is authorized and operations 502 and 504 of authorization enrollment update process 500 determine confidence levels of the authentications for the respective first authentication mode (e.g., face features) and second authentication mode (e.g., vocal features). Results of each authentication mode returns can be represented as $$\text{auth}_i(u)=(b_i,\gamma_i), i=1,2$$

where i denotes the authentication mode, $b_i$ is a Boolean value indicating authentication (true) or rejection (false) of user u, and $\gamma_i$ is the respective confidence level. For authentication mode i, a confidence threshold $\gamma_{i,A}$ is established for authentication such that $b_i$ is true if $\gamma_i \geq \gamma_{i,A}$ and $b_i$ is false if $\gamma_i < \gamma_{i,A}$. In other words, user u is authenticated for authentication mode i if the confidence for that mode exceeds the authentication threshold for that mode. A user is fully authenticated for access to the protected domain if $\gamma_i \geq \gamma_{i,A}$ for all authentication modes i. The authentication threshold $\gamma_{i,A}$ for authentication mode i may be established based on an error rate criterion for a test set of enrolled users and requesting users. In some cases, the threshold may be set to achieve an equal error rate of false positives and false negatives for the test set. In some cases, the threshold may be set to achieve a particular rate of false positive errors for the test set. In some cases, the threshold may be set to achieve a particular rate of false negative errors for the test set. In some cases, other criteria may be used to establish the threshold as will be understood by those of ordinary skill in the art.

As explained above, one of the first and second biometric identifiers may serve as a "ground truth" for the other of the first and second biometric identifiers. In order to serve as a "ground truth," however, a biometric identifier must indicate a match between the requesting user and an enrolled user with sufficiently high confidence, for instance with high enough confidence that if it were used as a single authentication factor it would have an error rate below an acceptable level for the domain being protected by the authentication system. In order for an authentication identifier to be considered as a "ground truth", there must be an additional confidence threshold $\gamma_{i,S}$ for the authentication mode with $\gamma_{i,S} > \gamma_{i,A}$ such that the condition $\gamma_i \geq \gamma_{i,S}$ indicates a "strong authentication" for authentication mode i. The threshold $\gamma_{i,S}$ may be selected such that it achieves a particular rate of false positive errors for a test set of enrolled users and requesting users. The particular rate may be selected to be low enough to be a tolerable false positive error rate for a single-factor authentication system, for instance 0.1 percent or lower.

As explained above, a user is authenticated in a multi-factor authentication system if $\gamma_i \geq \gamma_{iA}$ for all authentication modes i. Furthermore, a user authentication is referred to as strong with respect to authentication mode i if $\gamma_i \geq \gamma_{iS}$. If a user authentication is strong with respect to authentication mode i, authentication identifier i may serve as a "ground truth" for the other authentication identifier or identifiers.

Given a strong authentication of one of the first authentication mode and the second authentication mode for a requesting user u, additional embeddings can be collected during an authorization request that can be used to modify the currently stored centroid $c_u$ of u for the other of the authentication modes. We may also collect additional embeddings that can be used to modify the currently stored centroid for the authentication mode that is strongly authenticated. In a multi-factor authentication system, given a strong authentication for at least one of the multiple authentication modes, additional embeddings can be collected from the authentication requests for the other authentication modes and used to modify the currently stored centroids for those modes. Additional embeddings can also be collected from the authentication requests for the strongly authenticated modes and used to modify the currently stored centroids for those modes. Specifically, an example biometric authentication system 200 uses the following algorithm.

On an authentication attempt by requesting user u:
1. Run authentication of u. The authentication is run for the first and second authentication modes using first and second DNNs 802, 804 to compute embeddings and operations 408 to determine authentication results.
2. If $\gamma_1 \geq \gamma_{1A}$ and $\gamma_2 \geq \gamma_{2A}$, meaning that user u is authenticated, and
3. If $\gamma_i \geq \gamma_{iS}$ for one of the authentication modes designated by i (based upon outcome of operations 502-510), do:
   a) Let $f(w_1), f(w_2), \ldots, f(W_\ell)$ be the embeddings computed for u in the authentication attempt for authentication mode j where j≠i (where the embeddings are computed using one of the first and second DNNs 802, 804 at operation 406).
   b) Update the centroid $c_u$ for biometric factor j as follows (using first DNN 802 for operation 508 or using second DNN 804 for operation 512):

$$\overline{c}_u \leftarrow \frac{c_u + \beta(f(w_1) + f(w_2) + \cdots + f(w_\ell))}{1 + \ell\beta}$$

$$c_u = \frac{\overline{c}_u}{\|\overline{c}_u\|}$$

4. Optionally, carry out an update according to steps 3a and 3b for the centroid of strongly authenticated factor i.

In the above formulation, $\beta$ is a positive constant that determines how fast $c_u$ adapts as new strong authentications are received. With u strongly authenticated, the embeddings $f(w_i)$ are likely to be typical embeddings of u, and thus closer to the center of the cloud of embeddings of u. Over time, the updates will tend to bring $c_u$ closer to the true center of the cloud, thus correcting statistical deviations that might have occurred in the initial enrollment. This correction will result in a reduction of the number of failed authentications suffered by a user u, which may have been atypically high with a weak initial authorization enrollment setup.

In some cases, authentication systems use more than two factors for authentication. Enrollments can be updated in a multi-factor authentication system using an algorithm extended from the dual-factor algorithm described earlier.

On an authentication attempt by requesting user u:
1. Run authentication of u for Q authentication factors. The authentication is run using Q DNNs (such as DNN 802) to compute embeddings (such as in operation 406) and Q authentication determination operations (such as in operation 408) to determine authentication results.
2. If $\gamma_q \geq \gamma_{qA}$ for $q \in \{1, 2, \ldots Q\}$ meaning that user u is authenticated for all authentication modes, and
3. If $\gamma_q \geq \gamma_{qS}$ for one of the authentication modes designated by q (based upon outcome of operations 502-510), do for each $j \in \{1, 2, \ldots, Q\}$ where j≠q:
   a) Let $f(w_1), f(w_2), \ldots, f(W_\ell)$ be the embeddings computed for u in the authentication attempt for authentication mode j (where the embeddings are computed as in operation 406 using a DNN such as DNN 802).
   b) Update the centroid $c_u$ for biometric factor j as follows (using a DNN such as 802 for an operation such as 508):

$$\overline{c}_u \leftarrow \frac{c_u + \beta(f(w_1) + f(w_2) + \cdots + f(w_\ell))}{1 + \ell\beta}$$

$$c_u = \frac{\overline{c}_u}{\|\overline{c}_u\|}$$

4. Optionally, carry out an update according to steps 3a and 3b for the centroid of strongly authenticated factor q.

Whereas step 3 in the above algorithm indicates that the centroid updates in steps 3a and 3b for at least some authentication factors are triggered by one strong authentication among the Q authentication factors, those of ordinary skill in the art will understand that the updates could instead be triggered by a subset of two or more authentication factors which jointly provide a strong authentication. In such cases, sets of threshold values for strong authentication for various subsets of authentication factors can be established, for instance by experimentation with a test set.

D. Deep Neural Network Example

Figure 9:
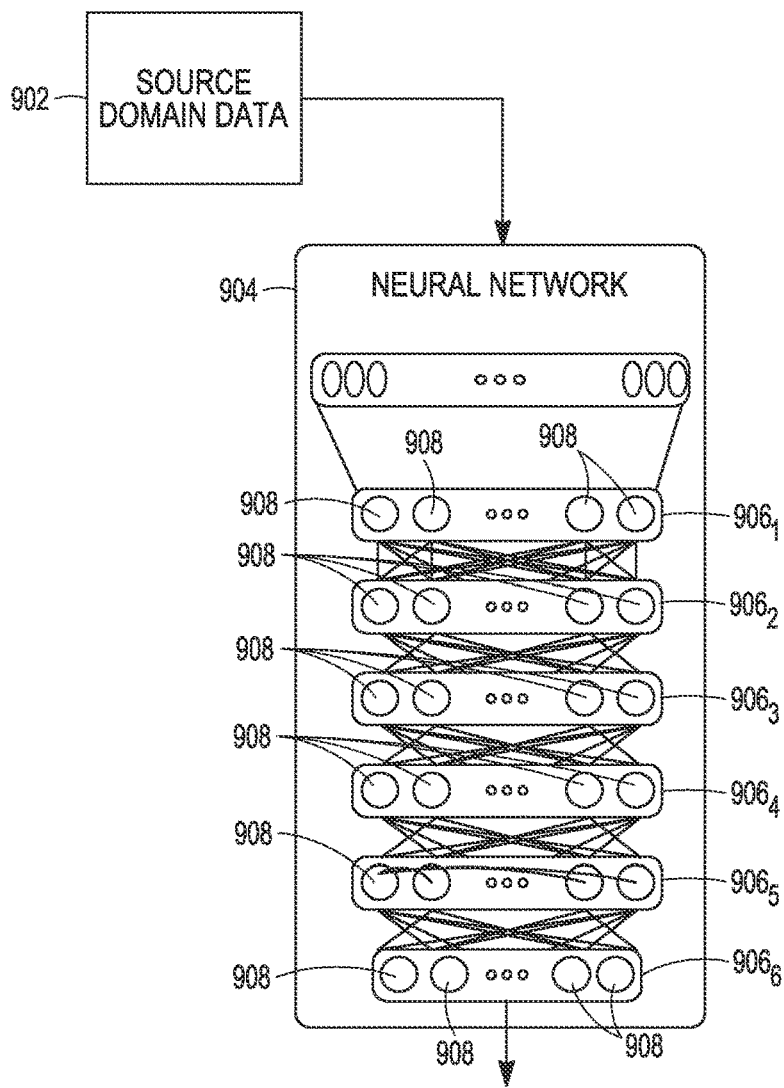
FIG. 9 is an illustrative drawing of an example neural network.
Figure 9:
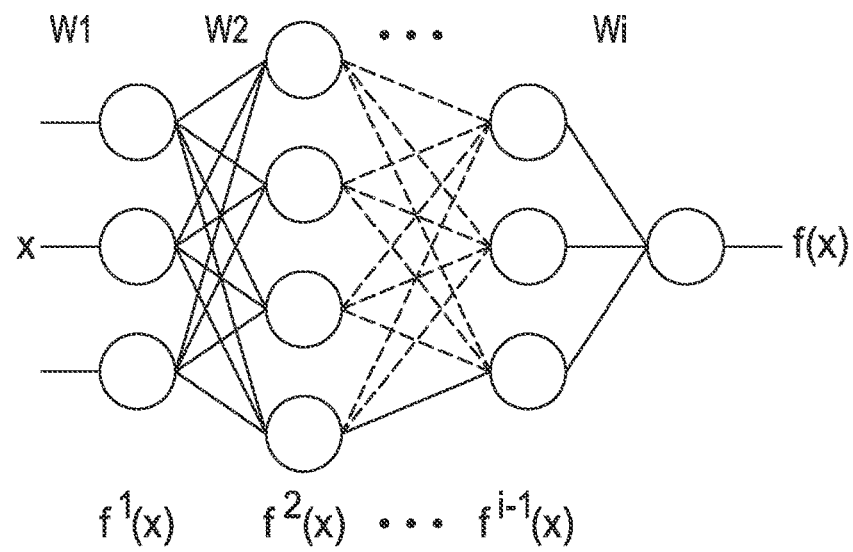

FIG. 9 is an illustrative drawing of an example neural network 904. As shown, the neural network 904 receives, as input, source domain data 902. The input is passed through a plurality of example layers $906_1$-$906_6$ to arrive at an output. Each layer $906_1$-$906_6$ includes multiple neurons 908. The neurons 908 at a layer $906_n$ receive input from neurons of a previous layer $906_{n-1}$ and may apply weights to the values received from those neurons 908; the neurons 908 may apply a nonlinearity to the sum of the weighted values received from the neurons of the previous layer $906_{n-1}$ in order to generate a neuron output. The neuron outputs from the example final layer $906_6$ are combined to generate the output of the neural network 904.

As illustrated at the bottom of FIG. 9, the input is a vector x. The input is passed through multiple layers $906_1$-$906_6$, where linear combination weights $W_1, W_2, \ldots, W_i$ are applied to the input to each respective layer to form inputs to respective functions $f^1(x), f^2(x), \ldots, f^{i-1}(x)$ until finally the output $f(x)$ is computed. In an example layer such as that depicted at the bottom of FIG. 9 a computation is carried out for each individual layer according to the formulation, $f(Wx+b)$, where x is an output of the previous layer, W is a matrix of weights applied to x, b is a bias vector, and f is an activation function.

In some example embodiments, the neural network 904 (e.g., deep learning, deep convolutional, or recurrent neural network) comprises a series of neurons 908, such as Long Short Term Memory (LSTM) nodes, arranged into a network. A neuron 908 is an architectural element used in data processing and artificial intelligence, particularly machine learning, which includes memory that may determine when to "remember" and when to "forget" values held in that memory based on the weights of inputs provided to the given neuron 908 or on other parameters of the neuron. Each of the neurons 908 used herein is configured to accept a predefined number of inputs from other neurons 908 in the neural network 904 to provide relational and sub-relational outputs for the content of the frames being analyzed. Individual neurons 908 may be chained together and/or organized into tree structures in various configurations of neural networks to provide interactions and relationship learning modeling for how each of the frames in an utterance are related to one another.

For example, an LSTM serving as a neuron includes several gates to handle input vectors e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct outputs. In training, if the cost function value is not within a pre-determined range, based on the known training images, backpropagation is used, where backpropagation is a common method of training artificial neural networks that are used with an optimization method such as a stochastic gradient descent (SGD) method.

Uses of backpropagation can include weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

E. Computer System Example

Figure 10:
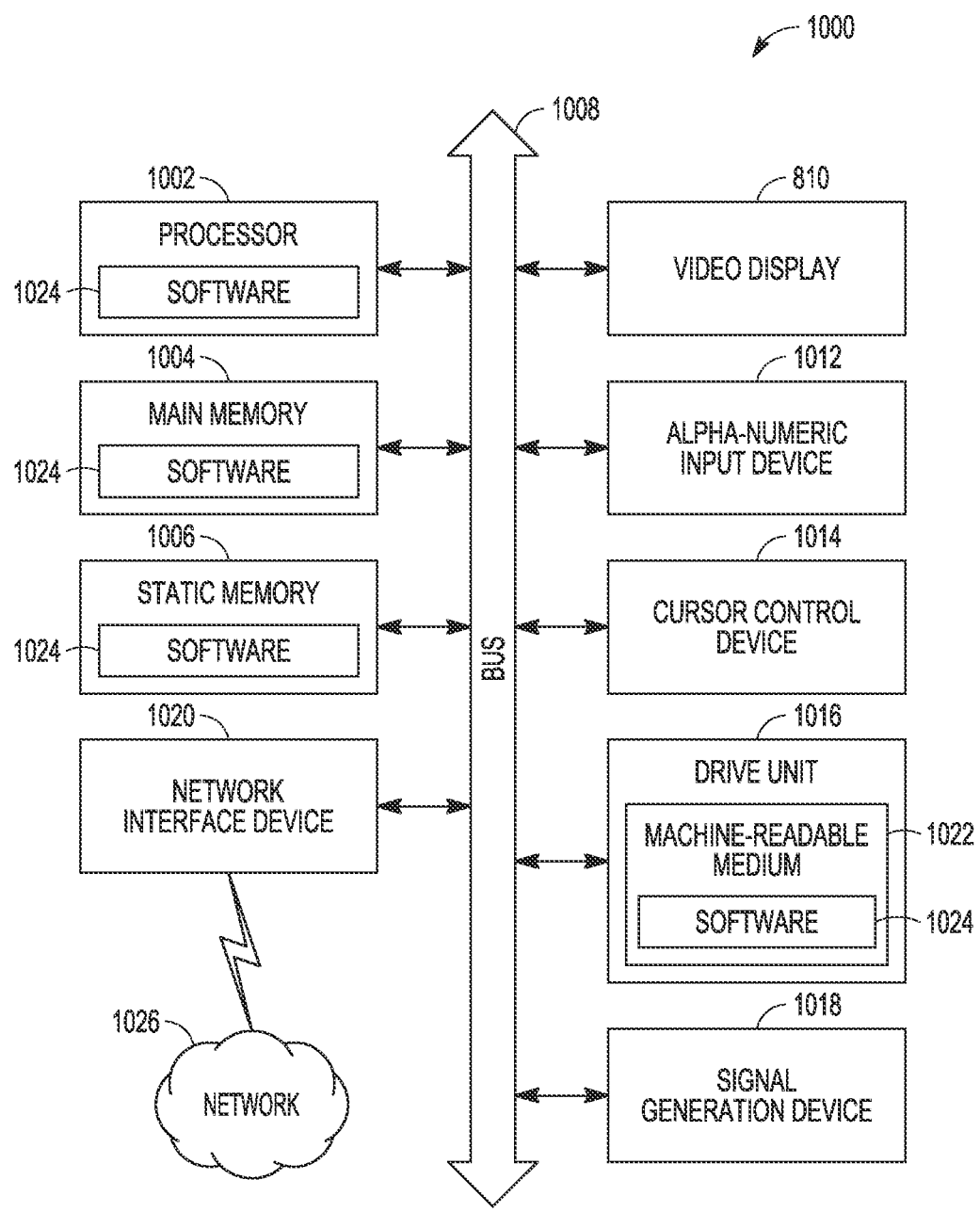
FIG. 10 is an illustrative block diagram of an example computer processing system architecture.

FIG. 10 is an illustrative block diagram of an example computer processing system architecture in which to implement the authentication manager 202 including the first DNN 802, the second DNN 804. The computer system, or variations thereof, is configured using instructions executable by processor circuitry to implement the perform data filtering to identify chronological moments, similarity matching, user experience interface cards, sequence position alignment, and interactive Sankey diagrams. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer processing system 1000 includes a hardware processor 1002 (e.g., a central processing unit (CPU), a graphics processing unit (GPU) or both), main memory 1004 and static memory 1006, which communicate with each other via bus 1008. The processing system 1000 may further include an electronic display unit 1020 (e.g., a plasma display, a liquid crystal display (LCD) or a cathode ray tube (CRT)). The processing system 2800 also includes alphanumeric input device 1022 (e.g., a keyboard), a user interface (UI) navigation device 1014 (e.g., a mouse, touch screen, or the like), a disk drive unit 1016, a signal generation device 1018 (e.g., a speaker), and a network interface device 1020.

The disk drive unit 1026, which can act as data storage 1025, includes computer-readable storage device 1022 on which is stored one or more sets of instructions and data structures (e.g., software 1024) embodying or utilized by any one or more of the methodologies or functions described herein. The software 1024 may also reside, completely or at least partially, within a computer readable storage device such as the main memory 1004 and/or within the processor 1022 during execution thereof by the processing system 1000, the main memory 1004 and the processor 1022 also constituting non-transitory-computer-readable media. The software 1024 may further be transmitted or received over network 1026 via a network interface device 1020 utilizing any one of a number of well-known transfer protocols (e.g., HTTP).

The above description is presented to enable any person skilled in the art to create and use an interactive analytic visualization system and method. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A multi-factor identification system comprising:
   a storage device that includes an authentication information that includes a plurality of respective enrolled user multi-factor identifiers that includes respective enrolled first factor identifiers and respective enrolled second factor identifiers;
   an authentication manager controller configured to:
   receive an authentication request that includes respective first factor unique user-identification information of a user and respective second factor unique user-identification information of the user;
   produce a request first factor identifier and a request second factor identifier, based upon the respective received first factor unique user-identification information and the respective received second factor unique user-identification information;
   search the authentication information for a match between the request first factor identifier and a respective enrolled first factor identifier and a match between the request second factor identifier and a respective enrolled second factor identifier;
   in response to finding a first match between the request first factor identifier and the respective enrolled first factor identifier and a second match between the request second factor identifier with the respective enrolled second factor identifier:
   send a signal indicating that the user is authenticated;
   identify a first confidence level for the first match and a second confidence level for the second match, wherein the first confidence level and the second confidence level are derived based on values of a distance metric and based at least in part on one of: a rate of false positives of observed unenrolled users who are authenticated and a rate of false negatives observed for enrolled users who are not authenticated;
   compare the first confidence level to the second confidence level;
   if it is determined that the first confidence level exceeds the second confidence level, update the respective second enrolled factor identifier with the request second factor identifier;
   if it is determined that the second confidence level exceeds the first confidence level, update the respective first enrolled factor identifier with the request first factor identifier;
   reduce authentication denials by using at least one of the updated first enrolled factor identifier or the updated second enrolled factor identifier to process a subsequent authentication request; and
   in response to not finding the first match or not finding the second match, send a signal indicating denial of access to the user.

2. The multi-factor identification system of claim 1, wherein update one of the respective matching first enrolled factor identifier and the respective matching second enrolled factor identifier includes one of,
   update the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier; and
   update the respective matching second enrolled factor identifier, based upon a confidence level of the match between the respective request first factor identifier and the respective matching enrolled first factor identifier exceeding a confidence level of the match between the respective request second factor identifier and the respective matching enrolled second factor identifier.

3. The multi-factor identification system of claim 1, wherein update one of the respective matching first enrolled factor identifier and the respective matching second enrolled factor identifier includes, update the respective matching first enrolled factor identifier, based further upon the confidence level of the match between the respective request second factor identifier and the respective matching enrolled second factor identifier exceeding a second prescribed confidence level.

4. The multi-factor identification system of claim 1,
wherein update one of the respective matching first enrolled factor identifier and the respective matching second enrolled factor identifier includes one of,
   wherein update the respective matching first enrolled factor identifier, based further upon the confidence level of the match between the respective request second factor identifier and the respective matching enrolled second factor identifier exceeding a second prescribed confidence level; and
   update the respective matching second enrolled factor identifier, based further upon the confidence level of the match between the respective request first factor identifier and the respective matching enrolled first factor identifier exceeding a first prescribed confidence level.

5. The multi-factor identification system of claim 1,
wherein update one of the respective matching first enrolled factor identifier and the respective matching second enrolled factor identifier includes,
update the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier and also exceeding a second prescribed confidence level.

6. The multi-factor identification system of claim 1,
wherein update one of the respective matching first enrolled factor identifier and the respective matching second enrolled factor identifier includes,
   update the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier and also exceeding a second prescribed confidence level; and
   update the respective matching second enrolled factor identifier, based upon a confidence level of the match between the respective request first factor identifier and the respective matching enrolled first factor identifier exceeding a confidence level of the match between the respective request second factor identifier and the respective matching enrolled second factor identifier and also exceeding a first prescribed confidence level.

7. The multi-factor identification system of claim 1,
the authentication manager system further configured to:
receive the respective first factor unique user-identification information and the respective second factor unique user-identification information corresponding to respective authorized users; and
produce the respective authorized user multi-factor identifiers corresponding to the respective authorized users based upon the respective received first factor unique user-identification information and the respective received second factor corresponding to the respective authorized users.

8. The multi-factor identification system of claim 1,
sending a signal to an access device indicating authentication.

9. The multi-factor identification system of claim 1,
wherein the first factor unique user-identification information includes a first biometric measurement and the respective second factor unique user-identification information includes a second biometric information.

10. A multi-factor identification method comprising:
a storing at a storage device, an authentication information that includes a plurality of respective enrolled user dual factor identifiers that includes respective enrolled first factor identifiers and respective enrolled second factor identifiers;
receiving an authentication request that includes respective first factor unique user-identification information of a user and respective second factor unique user-identification information of the user;
producing a request first factor identifier and a request second factor identifier, based upon the respective received first factor unique user-identification information and the respective received second factor unique user-identification information; searching the authentication information for a match between the request first factor identifier and a respective enrolled first factor identifier and a match between the request second factor identifier and a respective enrolled second factor identifier;
in response to finding a first match between the request first factor identifier and the respective enrolled first factor identifier and a second match between the request second factor identifier with the respective enrolled second factor identifier:
send a signal indicating that the user is authenticated;
identify a first confidence level for the first match and a second confidence level for the second match, wherein the first confidence level and the second confidence level are derived based on values of a distance metric and based at least in part on one of: a rate of false positives of observed unenrolled users who are authenticated and a rate of false negatives observed for enrolled users who are not authenticated;
compare the first confidence level to the second confidence level;
if it is determined that the first confidence level exceeds the second confidence level, update the respective second enrolled factor identifier with the request second factor identifier;
if it is determined that the second confidence level exceeds the first confidence level, update the respective first enrolled factor identifier with the request first factor identifier;
reduce authentication denials by using at least one of the updated first enrolled factor identifier or the updated second enrolled factor identifier to process a subsequent authentication request; and
in response to not finding the first match or not finding the second match, send a signal indicating denial of access to the user.

11. The method of claim 10,
wherein updating one of the respective matching first enrolled factor identifier and the respective matching second enrolled factor identifier includes one of, updating the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier; and updating the respective matching second enrolled factor identifier, based upon a confidence level of the match between the respective request first factor identifier and the respective matching enrolled first factor identifier exceeding a confidence level of the match between the respective request second factor identifier and the respective matching enrolled second factor identifier.

12. The method of claim 10,
wherein updating one of the respective matching first enrolled factor identifier and the respective matching second enrolled factor identifier includes,
updating the respective matching first enrolled factor identifier, based further upon the confidence level of the match between the respective request second factor identifier and the respective matching enrolled second factor identifier exceeding a second prescribed confidence level.

13. The method of claim 10,
wherein updating one of the respective matching first enrolled factor identifier and the respective matching second enrolled factor identifier includes one of,
updating the respective matching first enrolled factor identifier, based further upon the confidence level of the match between the respective request second factor identifier and the respective matching enrolled second factor identifier exceeding a second prescribed confidence level; and
updating the respective matching second enrolled factor identifier, based further upon the confidence level of the match between the respective request first factor identifier and the respective matching enrolled first factor identifier exceeding a first prescribed confidence level.

14. The dual factor identification system of claim 10,
wherein updating one of the respective matching first enrolled factor identifier and the respective matching second enrolled factor identifier includes,
updating the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier and also exceeding a second prescribed confidence level.

15. The method of claim 10,
wherein updating one of the respective matching first enrolled factor identifier and the respective matching second enrolled factor identifier includes one of,
updating the respective matching first enrolled factor identifier, based upon a confidence level of the match between the respective request second factor identifier and the respective matching enrolled second factor identifier exceeding a confidence level of the match between the respective request first factor identifier and the respective matching enrolled first factor identifier and also exceeding a second prescribed confidence level; and updating the respective matching second enrolled factor identifier, based upon a confidence level of the match between the respective request first factor identifier and the respective matching enrolled first factor identifier exceeding a confidence level of the match between the respective request second factor identifier and the respective matching enrolled second factor identifier and also exceeding a first prescribed confidence level.

16. The method of claim 10, further including:
receiving the respective first factor unique user-identification information and the respective second factor unique user-identification information corresponding to respective authorized users; and
producing the respective authorized user dual factor identifiers corresponding to the respective authorized users based upon respective received first factor unique user-identification information and the respective received second factor unique user-identification information corresponding to the respective authorized users.

17. A multi-factor identification system comprising:
processing circuitry; and
a memory system storing a storing authentication information that includes a plurality of respective enrolled user dual factor identifiers that include respective enrolled first factor identifiers and respective enrolled second factor identifiers, the memory system storing instructions which, when executed by the processing circuitry, cause the processing circuitry to perform operations comprising:
receiving an authentication request that includes respective first factor unique user-identification information of a user and respective second factor unique user-identification information of the user;
producing a request first factor identifier and a request second factor identifier, based upon the respective received first factor unique user-identification information and the respective received second factor biometric measurement;
searching the authentication information for a match between the request first factor identifier and a respective enrolled first factor identifier and a match between the request second factor identifier and a respective enrolled second factor identifier; in response to finding a first match between the request first factor identifier and the respective enrolled first factor identifier and a second match between the request second factor identifier with the respective enrolled second factor identifier;
send a signal indicating that the user is authenticated;
identify a first confidence level for the first match and a second confidence level for the second match, wherein the first confidence level and the second confidence level are derived based on values of a distance metric and based at least in part on one of: a rate of false positives of observed unenrolled users who are authenticated and a rate of false negatives observed for enrolled users who are not authenticated;
compare the first confidence level to the second confidence level;
if it is determined that the first confidence level exceeds the second confidence level, update the respective second enrolled factor identifier with the request second factor identifier;

if it is determined that the second confidence level exceeds the first confidence level, update the respective first enrolled factor identifier with the request first factor identifier;

reduce authentication denials by using at least one of the updated first enrolled factor identifier or the updated second enrolled factor identifier to process a subsequent authentication request; and in response to not finding the first match or not finding the second match, send a signal indicating denial of access to the user.

18. A non-transitory machine-readable storage medium comprising instructions that, when executed by one or more processors of a machine, cause the machine to perform operations comprising:

receiving an authentication request that includes respective first factor unique user-identification information of a user and respective second factor unique user-identification information of the user;

producing a request first factor identifier and a request second factor identifier, based upon the respective received first factor unique user-identification information and the respective received second factor unique user-identification information;

searching authentication information, stored in a memory device and that includes a plurality of respective enrolled user dual factor identifiers that include respective enrolled first factor identifiers and respective enrolled second factor identifiers, for a match between the request first factor identifier and a respective enrolled first factor identifier and a match between the request second factor identifier and a respective enrolled second factor identifier; in response to finding a match between the request first factor identifier and the respective enrolled first factor identifier and a match between the request second factor identifier with the respective enrolled second factor identifier;

send a signal indicating that the user is authenticated;

identify a first confidence level for the first match and a second confidence level for the second match, wherein the first confidence level and the second confidence level are derived based on values of a distance metric and based at least in part on one of: a rate of false positives of observed unenrolled users who are authenticated and a rate of false negatives observed for enrolled users who are not authenticated;

compare the first confidence level to the second confidence level;

if it is determined that the first confidence level exceeds the second confidence level, update the respective second enrolled factor identifier with the request second factor identifier;

if it is determined that the second confidence level exceeds the first confidence level, update the respective first enrolled factor identifier with the request first factor identifier;

reduce authentication denials by using at least one of the updated first enrolled factor identifier or the updated second enrolled factor identifier to process a subsequent authentication request; and in response to not finding the first match or not finding the second match, send a signal indicating denial of access to the user.

* * * * *